No. 826,623. PATENTED JULY 24, 1906.
J. A. SWINEHART.
PNEUMATIC TIRE.
APPLICATION FILED OCT. 25, 1905.

ATTEST.
A. U. Moser.
C. A. Sell.

INVENTOR.
James A. Swinehart
By H. T. Fisher ATTY.

UNITED STATES PATENT OFFICE.

JAMES A. SWINEHART, OF AKRON, OHIO.

PNEUMATIC TIRE.

No. 826,623.

Specification of Letters Patent.

Patented July 24, 1906.

Application filed October 25, 1905. Serial No. 284,272.

*To all whom it may concern:*

Be it known that I, JAMES A. SWINEHART, a citizen of the United States, residing at Akron, in the county of Summit and State of Ohio, have invented certain new and useful Improvements in Single-Tube Pneumatic Tires; and I do declare that the following is a full, clear, and exact description of the invention, which will enable others skilled in the art to which it appertains to make and use the same.

My invention relates to a single-tube pneumatic tire adapted to be used with a clencher-rim; and the objects of the invention are, first, to provide a single-tube pneumatic tire which is so constructed that it will prevent rim-cutting when the tire becomes deflated while on the road, and, secondly, to provide a tire of this kind which can be practically renewed and continued in use when it has been punctured to an extent that it is beyond repair or recovery by the ordinary methods.

Figure 1:
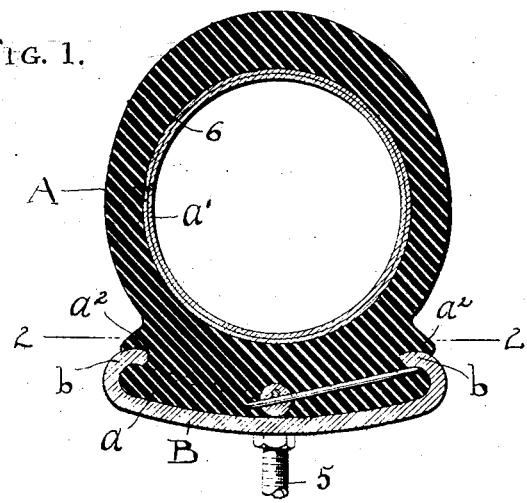
Figure 2:
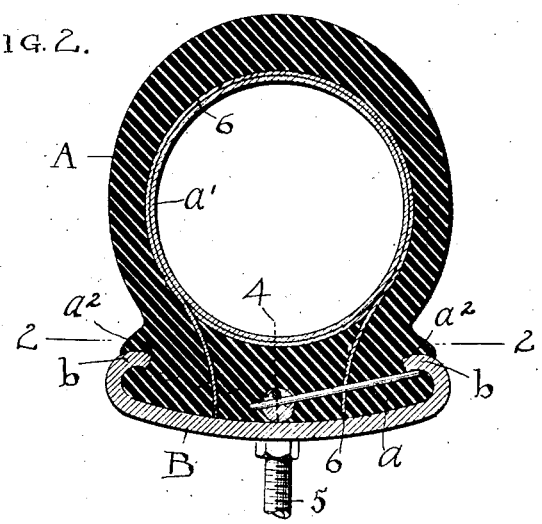

In the accompanying drawings, Figure 1 is a perspective view of a sectional portion of a tire embodying my invention, and Fig. 2 is a cross-section of a modification thereof.

As thus shown, A represents a single-tube pneumatic tire as a whole, and $a$ is the base or inner portion thereof which engages in rim B. Said rim necessarily is of the so-called "clencher" variety and may be of the particular style shown herein and on which I have Letters Patent or any other suitable and effective style or kind of clencher-rim.

An essential and novel feature of the tire is the solid portion or base $a$, which is of such depth relatively from inner tube $a'$ inward that a line corresponding to 2 2, Figs. 1 and 2, and drawn between tube $a'$ and said base will be on a plane outside of the edges $b$ of rim B, thus affording a solid sustaining-base for the load within the said edges of the rim apart from the tube and which with the thickness of the collapsed tire outside of said base will be ample to carry the load and prevent possible rim-cutting even if the tire be wholly deflated by puncturing or otherwise and has to travel in that condition pending repairs. Obviously this advantage is obtained by reason of the base of the tire being solid to such depth as to take the load rather than putting it on the edges of the rim, as formerly, and which is practically equivalent to having the tire solid throughout, at least so far as the temporary needs of the tire are concerned. This construction and adaptation is important, furthermore, because it enables me to employ a clencher-rim with a single-tube pneumatic tire and which would be impracticable or impossible if the plane of the inner tube $a'$ were to come down so as to be measurably between the clencher edges of the rim and serve to assist in holding the tire on the rim in the old way. In that case any accidental deflation of the said tube by puncture or otherwise would almost certainly release the tire from its fastenings, and it would be violently cast off the wheel if the machine were under any considerable speed. If not cast off, it would rim-cut and be ruined. Of course such contingencies must be guarded against by every possible precaution, and hence I have made the present construction of tire which combines the best advantages of a pneumatic tire and a solid tire, both of which have deservedly-popular features. By these means I am enabled to bring to a pneumatic tire the safety of the clencher-rim, which has heretofore been possible only to solid-rubber tires. This is done by solidifying the base of the tire to a depth relatively as shown and locking the same on the clencher principle in the present or any other effective way. Incidentally to this and as a most important advantage I also prevent rim-cutting, as already described, which materially enhances the value of the invention, because it provides against what is otherwise a very defective construction, as well as a possible cause of material expense and danger to the user. Finally and as planned for in the construction of the tire A, I am enabled to take care of an otherwise-irremediable puncture or leak in the tire by removing it from the wheel and slitting the same centrally in the base around its entire inner circumference on a line corresponding to dotted line 4, Fig. 2, and then inserting an inner or supplemental tube within the punctured tube, which is brought into operating relation with and adapted to be filled through valve-nipple 5, as usual. The outer of the two tubes will thus inclose the inner tube, and the tire can be placed back on the wheel in as good or better condition than originally and at a comparatively small expense, especially as compared with an entirely new tire. When the split tire is restored to the wheel, it is locked within rim B as originally, and it is none the less firm therein and efficient in service, notwithstanding said slit.

The tire A has channels or grooves $a^2$ or their equivalent at its sides extending entirely around the base of the tire, as shown in the present construction, and adapted to have the edges b of the rim engage therewith just as if the whole tire were solid. It will be seen that the rubber about tube a' is unitary with base a, so that the entire tire goes on the market as one complete article of manufacture without the rim.

In Fig. 2 I further show the outer ply 6 of the fabric of inner tube a' brought down at its edges into base a, which makes an effective anchorage for said tube and prevents it pulling away from the base.

The base a may be exclusively of rubber and without other material or a composite or the like, so as to afford a means of engagement in the rim which will positively secure the tire and prevent rim-cutting, as described, besides being adapted to be split to insert a second or supplemental tube.

What I claim is—

1. A pneumatic tire having a solid base, in combination with a clencher-rim in which said base is engaged at its edges, the said base having a solid depth greater than the depth of the rim and filling the space between and above the edges of the rim, the edges of the fabric lining the inside of the tube extending through said base, metallic pieces transversely of said base through said fabric engaging beneath the edges of the rim, and a tie centrally of said base with which said transverse pieces engage.

2. In vehicle-wheels, a clencher-rim, a combined pneumatic and solid-rubber tire comprising an endless pneumatic tube and a solid base therefor of greater depth from side to side than said rim, whereby when said pneumatic tube collapses the tire rides on said base and not on the edges of the rim, and means transfixing the tire beneath the edges of said rim, and a metallic tie in the base of the tire with which said transfixing means are engaged.

In testimony whereof I sign this specification in the presence of two witnesses.

JAMES A. SWINEHART.

Witnesses:
  C. A. SELL,
  A. W. MOSER.